US007623460B2

(12) United States Patent  (10) Patent No.: US 7,623,460 B2
Miyazaki  (45) Date of Patent: Nov. 24, 2009

(54) CLUSTER SYSTEM, LOAD DISTRIBUTION METHOD, OPTIMIZATION CLIENT PROGRAM, AND ARBITRATION SERVER PROGRAM

(75) Inventor: Manabu Miyazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 360 days.

(21) Appl. No.: 11/737,833

(22) Filed: Apr. 20, 2007

(65) Prior Publication Data

US 2007/0286184 A1 Dec. 13, 2007

(30) Foreign Application Priority Data

May 19, 2006 (JP) ............... 2006-140202

(51) Int. Cl.
*H04L 12/26* (2006.01)
(52) U.S. Cl. .......... 370/235; 370/237; 370/254
(58) Field of Classification Search ........ 370/229, 370/232, 233, 234, 235, 237, 235.1, 238, 370/242, 248, 252, 253, 254
See application file for complete search history.

(56) References Cited

U.S. PATENT DOCUMENTS 7,275,103 B1 * 9/2007 Thrasher et al. ............ 709/224
7,469,289 B2 * 12/2008 Arakawa et al. ............ 709/224

2007/0234113 A1 * 10/2007 Komatsu et al. ............ 714/8

FOREIGN PATENT DOCUMENTS

| JP | 5-089064 | 4/1993 |
| JP | 7-250085 | 9/1995 |
| JP | 9-16534 | 1/1997 |
| JP | 11-65727 | 3/1999 |
| JP | 2002-163241 | 6/2002 |

* cited by examiner

*Primary Examiner*—Brenda Pham
(74) *Attorney, Agent, or Firm*—Whitham Curtis Christofferson & Cook, PC

(57) ABSTRACT

An exemplary cluster system according to the present invention includes a first node including a plurality of paths respectively connected to I/O slots via a switch and a second node including a plurality of paths connected to the switch, wherein the first node includes a first load measuring part which measures a first load for each path thereof, and the switch makes switching to disconnect an I/O slot from the first node and connect the I/O slot to the second node when the first load of the path connected to the I/O slot is higher than a first threshold.

8 Claims, 7 Drawing Sheets

CLUSTER SYSTEM, LOAD DISTRIBUTION METHOD, OPTIMIZATION CLIENT PROGRAM, AND ARBITRATION SERVER PROGRAM

This application is based upon and claims the benefit of priority from Japanese patent application No. 2006-140202, filed on May 19, 2006, the disclosure of which is incorporated herein in its entirety by reference

BACKGROUND OF THE INVENTION

1. Field of the Invention

The present invention relates to a cluster system including plural information processing units (nodes) and a load distribution method, more particularly to a cluster system having a switch for changing the connection between each of the plurality of nodes and an I/O slot, as well as a load distribution method employed for the cluster system.

2. Description of the Related Art

In recent years, there has been increasing a demand of a cluster system including many information processing units (nodes) that enables processing to be continued without stopping even at the time of error occurrence, thereby improving the processing performance. In such a cluster system, the load distribution method, that is, how jobs/tasks are to be distributed among respective nodes becomes important.

In conventional cluster systems, the mainstream of such load distribution has been to distribute the load based on processor resources. And in order to realize a flexible load distribution system, the nodes have been required to be the same in hardware configuration. Concretely, in case where there is a storage that can be accessed only by a node, any of other nodes cannot access the storage while a load is concentrated on the node and the storage. Thus other nodes cannot process the load. In order to avoid such a trouble every node has to be capable of accessing all storages. In any of the conventional systems, however, the connection between each I/O adapter (e.g., PCI slot) and each bridge (e.g., PCI Bridge) is fixed in the I/O device configuration in each node. This is why the same number of adapters has been required to be used for all the nodes to distribute the load properly. As a result, the I/O device configuration has become very redundant and costly.

On the other hand, there has been developed a cluster system capable of changing the connection between a PCI bridge and each PCI slot freely with use of a switch provided between the PCI bridge of each node and each PCI slot to implement a more flexible I/O device configuration. In this case, because the connection between each node and each PCI slot can be changed by controlling the switch, there is no need to prepare the same number of adapters as the number of the nodes. Thus the adapters can be used efficiently. In such a cluster system, it is also expected that less adapters are used efficiently according to load changes of each node.

In any of the load distribution methods according to the conventional technology, the load to be distributed is determined according to processor resources. Consequently, if a problem arises in a transfer path of input/output data from an IO device to a processor, the load is not always distributed properly. For example, even if a load is inputted to a processor that is not used efficiently and the data transfer path leading to the IO slot of the node is in congestion, the processor might not process the load. This is why the system performance is not improved even if load distribution is made according to processor resources.

Furthermore, if an adapter card is prepared so as to enable every node to access every IO device to realize the flexible load distribution as described above, the card use efficiency falls and the cost rises. And if only the necessary number of adapters is prepared to lower the cost, it is difficult to appropriately process the load that changes from time to time.

There are some other conventional techniques disclosed in the following patent documents. JP 2002-163241A discloses a client server system that reconfigures dynamically service provider side resources according to demand changes. JP1993-089064A also discloses a computer system having a load management unit that makes communications with a host computer through the plurality of device control units, there by monitoring the load state of each of those device control units. This load management unit changes a device control unit or device that makes a communication with the host computer according to the load state of the device control unit. On the other hand, JP 1995-250085A discloses a load distribution method for buses in a data communication apparatus. This data communication apparatus includes plural modules, plural buses, and a controller for selecting a bus to be connected to a module according to a traffic volume of each module. JP 1997-016534A discloses a distribution type processing method employed for plural distributed and network-connected computers. According to this method, jobs are distributed to and executed in server processes according to the information related to hardware resources such as the static performance of each computer and the changes of the dynamic load state, as well as the information related to the hardware environment in the computer environment. Furthermore, JP 1999-065727A discloses a computer that executes load distribution among I/O buses by changing the connection of an I/O slot to a given I/O bus.

SUMMARY OF THE INVENTION

Under such circumstances, it is an exemplary object of the present invention to provide a cluster system that prevents lowering of system performance to be caused by load distribution. Particularly, it is an exemplary object of the present invention to provide a cluster system capable of changing a data transfer path from a node to an I/O device dynamically.

An exemplary cluster system according to the present invention includes a first node including a plurality of paths respectively connected to I/O slots via a switch and a second node including a plurality of paths connected to the switch, wherein the first node includes a first load measuring part which measures a first load for each path thereof, and the switch makes switching to disconnect an I/O slot from the first node and connect the I/O slot to the second node when the first load of the path connected to the I/O slot is higher than a first threshold.

An exemplary computer according to the present invention includes a plurality of paths respectively connected to each of a plurality of I/O slots and a first load measuring part which measures a first load for each of the plurality of paths, wherein the computer causes disconnection of an I/O slot from the computer and connection of the I/O slot to a separate computer, when the first load of the path connected to the I/O slot is higher than a first threshold.

An exemplary method according to the present invention includes measuring a load (first load) of each of a plurality of paths connecting a node computer to each of an plurality of I/O slots through a switch, disconnecting, when the first load of one of the plurality of paths is higher than a first threshold, one of the I/O slots connected to the path, and connecting the one of I/O slots to a second node connected to the switch.

DETAILED DESCRIPTION OF THE INVENTION

Figure 1:
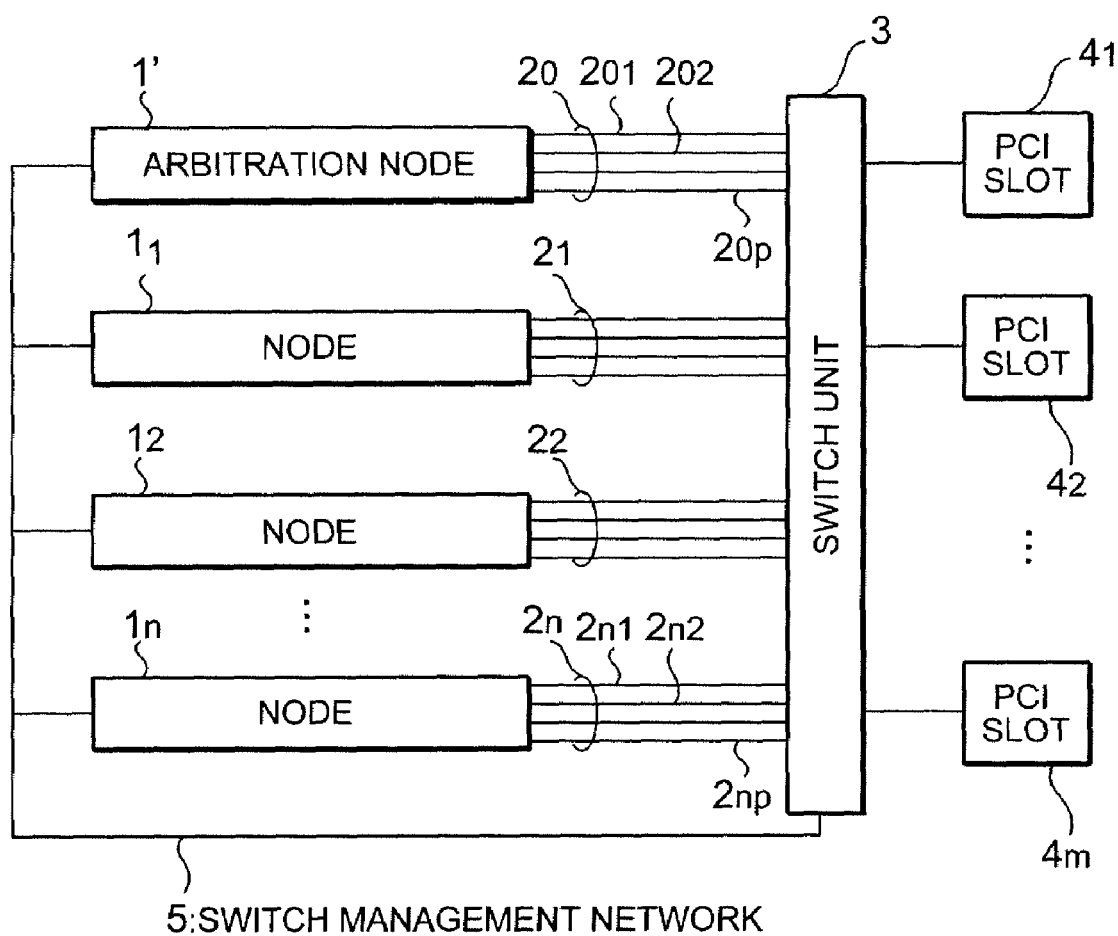
FIG. 1 is a configuration of a cluster system in an embodiment of the present invention.

Hereunder, an exemplary embodiment of a cluster system of the present invention will be described with reference to the accompanying drawings. In those drawings, the same reference numerals will represent the same components, avoiding redundant description.

(Configuration)

In this exemplary embodiment, a mount rack type blade server will be described as an example. FIG. 1 shows a configuration of the blade server in this exemplary embodiment of the present invention. The blade server shown in FIG. 1 includes an arbitration node 1', plural nodes $1_1$ to $1n$, plural PCI (Peripheral Components Interconnect) buses $2_0$ to $2n$, and a switch unit 3, plural PCI slots $4_1$ to $4m$. Each PCI bus is composed of plural bus lines. For example, the PCI bus $2n$ has bus lines $2n1$ to $2np$. The arbitration node 1' and the node 1 are computers (server blades) having a processor and a memory respectively. The arbitration node 1' and each node 1 can be connected to each other through a PCI bus 2 and a PCI slot 4. The switch unit 3 is provided between the PCI buses 2 and the PCI slots 4. The switch unit 3 connects one of the PCI bus lines $2_{01}$ to $2np$ provided for the arbitration node 1' and each of the nodes $1_1$ to $1n$ to one of the PCI slots $4_1$ to $4m$ selectively. The switch unit 3, the arbitration node 1', and each node 1 are connected to each another through a switch management network 5. In this exemplary embodiment, PCI is adopted as the standard for both extension buses and extension slots. However, another standard may also be adopted for them. The PCI slots $4_1$ to $4m$ may be the same in bus width or they may be different in bus width in the configuration. The number of PCI bus lines ($2_{01}$ to $20p$, $2_{11}$ to $21p$, etc.) of each of the PCI buses $2_0$ to $2n$ may be the same or may be different. FIG. 1 sows the example where the number of PCI bus lines is fixed at p lines.

The switch unit 3 is, for example, an IC chip having a switching function. In this exemplary embodiment, the switch unit 3 and the PCI slots 4 make an I/O package mounted on one substrate. The arbitration node 1' and the nodes 1 are mounted in this I/O package through an adapter card (not shown) to form a blade server (cluster system). The switch management network 5 is a communication bus provided separately from the PCI buses 2 used as fast transmission buses for transferring input/output data. The arbitration node 1' and each node 1 control the switch unit 3 through the switch management network 5 to change the configuration of the switch unit 3. In other words, the switch management network 5 that is not used for data transmission is used to control switches doesn't require fast transmission, thereby the data transmission buses can be used efficiently.

Figure 2:
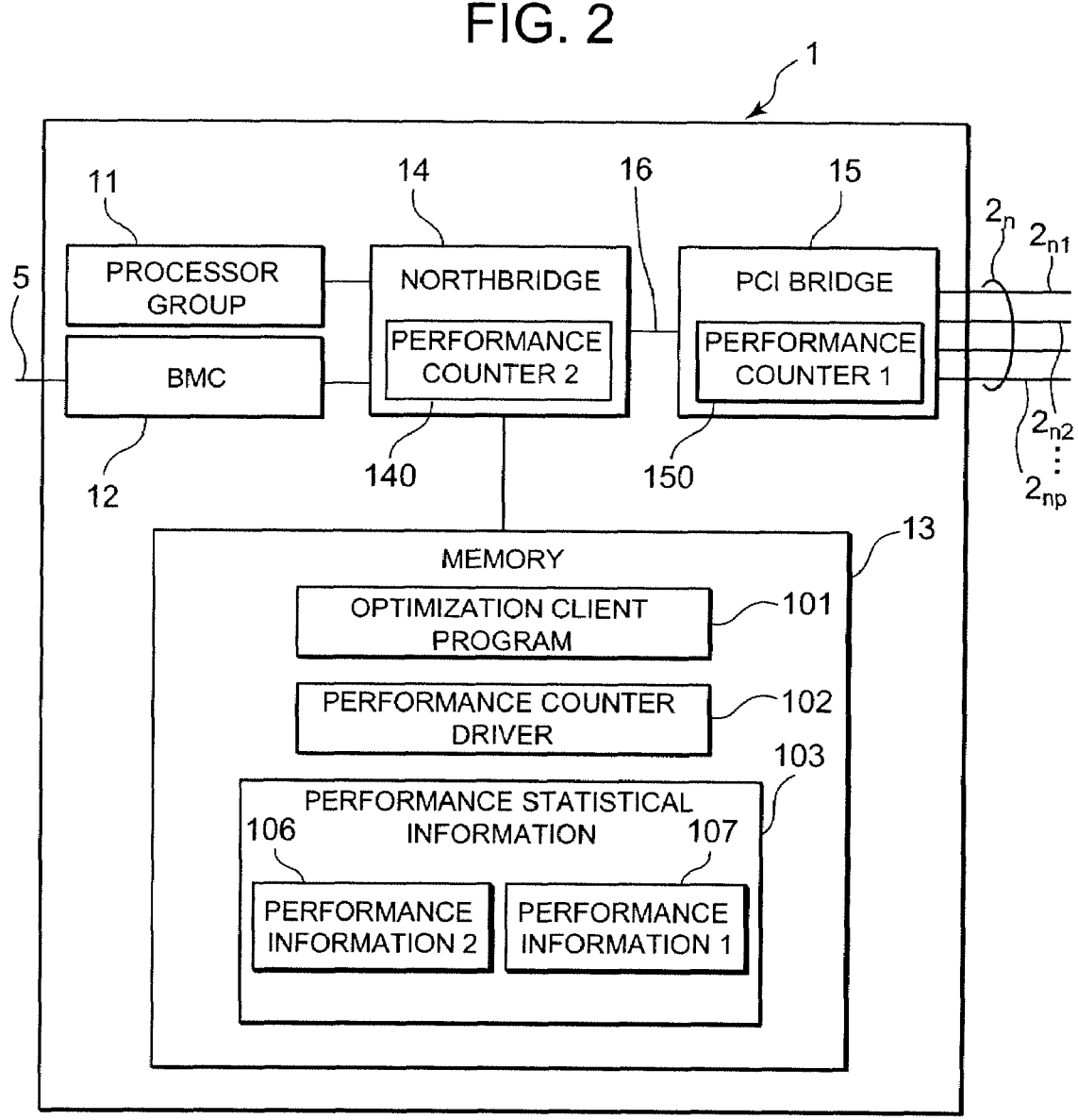
FIG. 2 is a configuration of a node in an embodiment of the present invention.

FIG. 2 shows a configuration of a node 1 in this exemplary embodiment of the present invention. In FIG. 2, the node 1 has a processor group 11 consisting of plural processors, a BMC (Baseboard Management Controller) 12, a memory 13, a northbridge 14, a PCI bridge 15, and an internal bus 16. The processor group 11 is connected to the PCI buses 2 through the northbridge 14 and the PCI bridge 15. The northbridge 14 is connected to the processor group 11, the BMC 12, the memory 13, and the internal bus 16. The northbridge 14 is a chip set provided with an interface for controlling information transmission between each connected device and the processor group 11, as well as a memory controller. The northbridge 14 is connected to the PCI bridge 15 through the internal bus 16 and controls information transmission in the internal bus 16. The PCI bridge 15 is a chip set connected to the PCI buses 2 and used to control information transmission in the PCI buses 2. The memory 13 is such storage as a ROM and used to store an optimization client program 101 and a performance counter driver 102. The memory 13 should also store performance statistical information 103 as history data of a load state between its own node and a PCI slot 4.

The northbridge 14 has a performance counter 140 for monitoring the performance information 106 in the internal bus 16. The PCI bridge 15 has a performance counter 150 for monitoring the performance information 107 of each PCI bus 2 between the switch unit 3 and the PCI bridge 15. In case where plural PCI bus lines (e.g., PCI bus lines $2n1$ to $2np$) in each PCI bus 2 (e.g., PCI bus $2n$), the performance counter 150 monitors the performance information 107 with respect to each PCI bus line (e.g., each of the PCI bus lines $2n1$ to $2np$). Here, the performance information items 106 and 107 means load state information in each bus. For example, the information is the usage rate and the number of transactions of each bus.

The processor group 11 is a multiprocessor such as an SMP (Symmetric Multiple Processor) or an ASMP (Asymmetric Multiple Processor). The processor group 11 processes tasks received from the arbitration node 1' through the PCI buses 2. The processor group 11 executes the optimization client program 101 and the performance counter driver 102 stored in the memory 13 to monitor the load applied between its own node and a PCI slot 4 to control the switch unit 3.

The optimization client program 101 and the performance counter driver 102 are programs executed on an OS (Operating System). The processor group 11 operates the performance counter driver 102 to control the performance counters 140 and 150 to read the performance information items 106 and 107 existing between each processor group 11 and each PCI slot 4. The performance information items 106 and 107 may be read periodically or any time. However, in order to monitor the history of load state changes, the performance information items 106 and 107 should preferably be read periodically. At that time, the processor group 11 stores the performance information items 106 and 107 read periodically as performance statistical information 103 in the memory 13.

The processor group 11 executes the optimization client program 101 to, for example, make the following processing.

1. Monitoring the load state between the processor group 11 and each PCI slot 4
2. Issuing an optimization request to the arbitration node 1' if a monitoring section enters a high load state 3. Sending the performance information items 106 and 107 or performance statistical information 108 in response to a request from the arbitration node 1'
4. Executing an inputted load program and controlling the switch unit 3 to change the PCI slot to which its own node is connected The BMC 12 is connected to the processor group 11 and the memory 13 through a serial bus. The BMC 12 monitors the state in each node independently of the processor group 11 and the OS. The BMC 12 is also connected to the switch unit 3 and the arbitration node 1' through the switch management network 5. The BMC 12 obtains the configuration information 114 of the switch unit 3 through the switch management network 5 and sends the information 114 to the object processor group 11. Here, the configuration information 114 denotes an object PCI slot 4 to which the arbitration node 1' and an object node 1 are connected. In other words, the information 114 denotes the connection between a node and a PCI slot. In case where it is needed to control the switch unit 3 to obtain the configuration information 14, the processor group 11 uses the BMC 12 and the switch management network 5 that are different from PCI bus 21 that is an ordinary transmission path, since there is no need to use a fast path.

Figure 3:
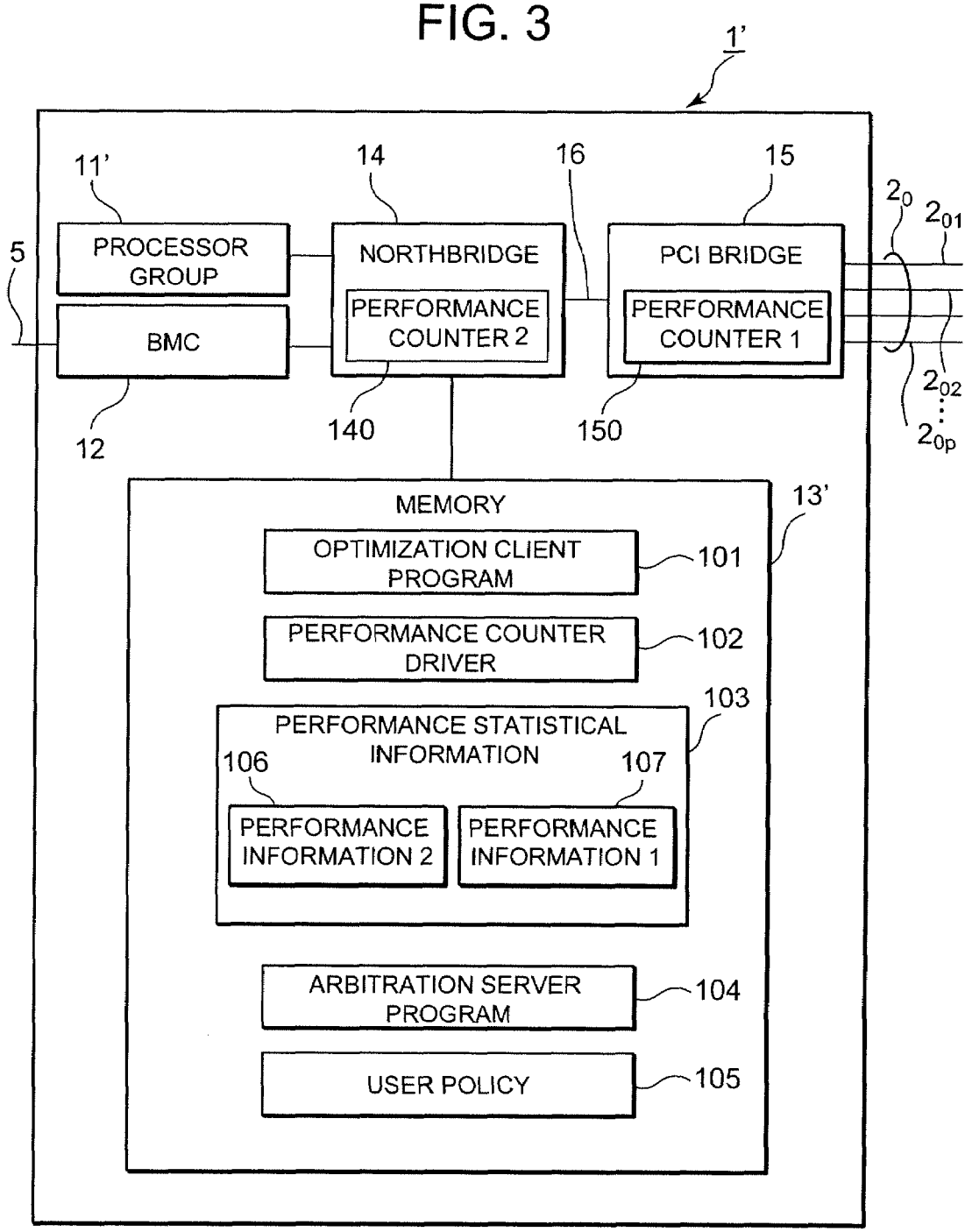
FIG. 3 is a configuration of an arbitration node in an embodiment of the present invention.

The blade server of the present invention uses a given node selected from among plural nodes as an arbitration node 1'. FIG. 3 shows a configuration of the arbitration node 1' of the present invention in an embodiment. As shown in FIG. 3, just like each node 1, the arbitration node 1' includes a processor group 11', a BMC (Baseboard Management Controller) 12, a memory 13', a north bridge 14, a PCI bridge 15, and an internal bus 16. Although the node 1 and the arbitration node 1' are the same in configuration, those nodes 1 and 1' are different from other nodes 1 in that the memory 13' stores an arbitration server program 104 and a user policy 105. The memory 13' also stores the optimization client program 101 and the performance counter driver 102, and the performance statistical information 103 just like other nodes 1. The processor group 11' of the arbitration node 1' executes the optimization client program 101 and the performance counter driver 102 to monitor the load state between the processor group 11' and each PCI slot 4, notify a high load state, and change the current PCI slot 4 just like the processor group 11. Hereinafter, the operation of the processor group 11' for executing the optimization client program 101 is the same as that of the processor group 11, so that the description will be omitted.

The processor group 11' of the arbitration node 1' executes the arbitration server program 104 to obtain the performance information items 106 and 107 from each of the nodes $1_1$ to $1n$ and uses the information items 106 and 107 to determine an optimized configuration. Concretely, the arbitration node 1' determines an optimized configuration according to the usage rate of the CPU of every node, as well as the performance information items 106 and 107 obtained from every node. Here, determination of the optimized configuration means to specify a load (task) to be processed by the arbitration node and each of the nodes $1_1$ to $1n$. The processor group 11' determines an optimized configuration so that the usage rate of the CPU in each node and the load of a data transfer path between each node and a PCI slot are distributed properly. The processor group 11' obtains the usage rate of the CPU in each node with use of a conventional method. The processor group 11' sends the determined optimized configuration to the object node 1 as optimized configuration information 109.

Furthermore, the processor group 11' determines a PCI slot 4 to which the arbitration node 1' and each node 1 are to be connected according to the performance information items 106 and 107 and issues a configuration change request 113 to the node 1. The configuration change request 113 includes the connection among the arbitration node, each of the nodes 1, and each PCI slot 4. In response to the request 113, each of the arbitration node 1' and the nodes 1 changes its connected PCI slot 4 to a specified one.

The user policy stored in the memory 13' is a condition for determining whether to change the current configuration (connection among the arbitration node 1', each of nodes 1, and each PCI slot 4). For example, as the user policy 105, a reference value for determining whether or not the path between a node 1 and a PCI slot 4 is in the high load state, as well as a high load state allowable continuous time are set. The processor group 11' determines whether to change the current configuration according to the performance statistical information 108 transferred from the arbitration node 1', as well as the user policy 105.

Figure 4:
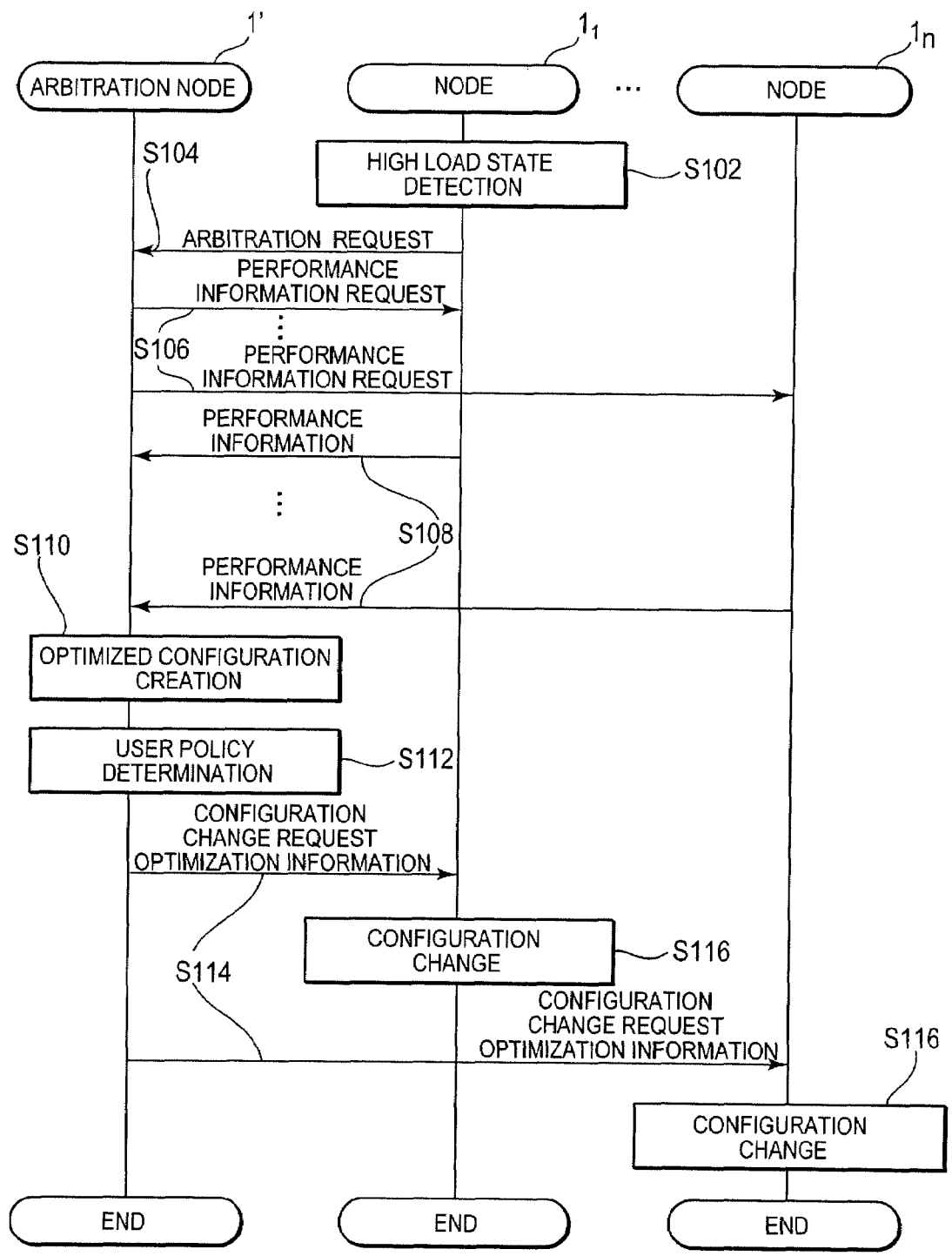
FIG. 4 is a sequence chart of configuration change processing by the cluster system in the exemplary embodiment of the present invention.
Figure 5:
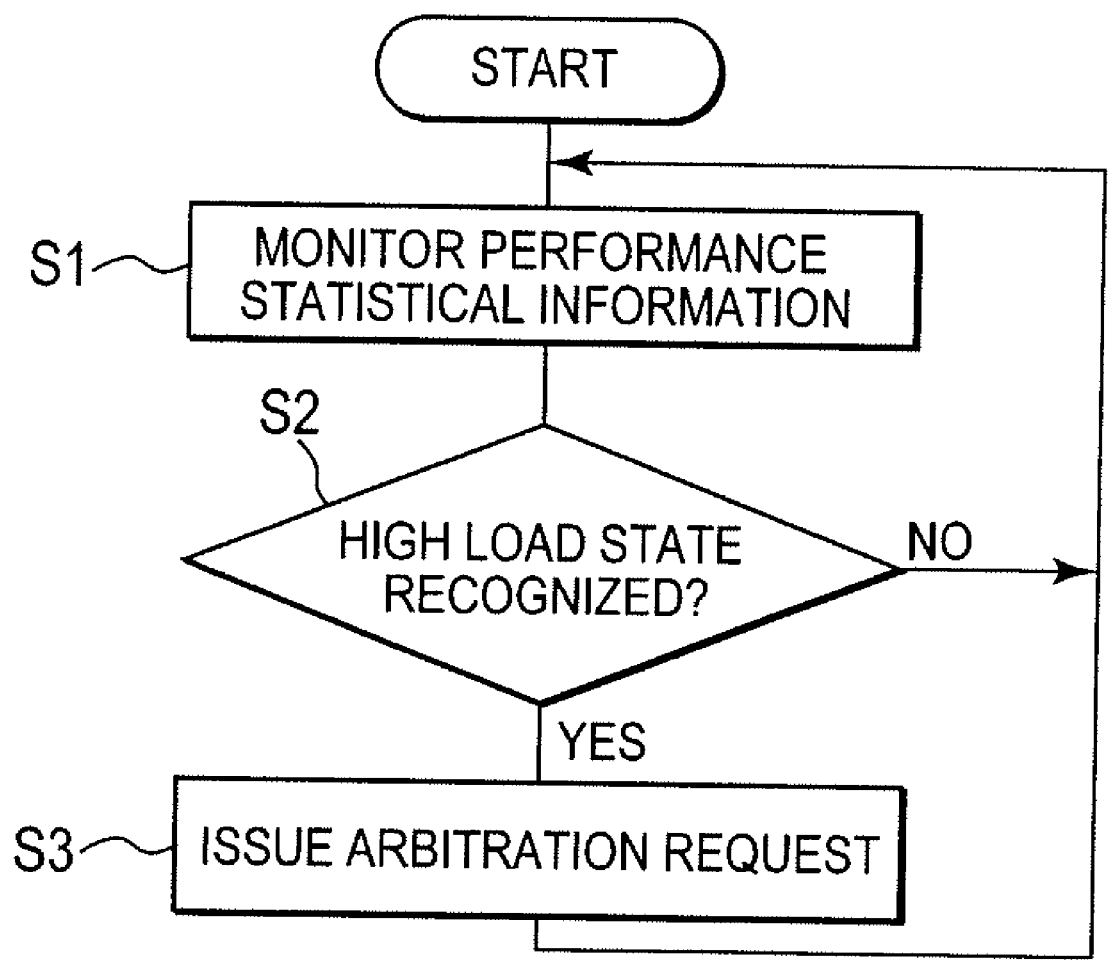
FIG. 5 is a flowchart of arbitration request processing by an optimization client program of the present invention.
Figure 6:
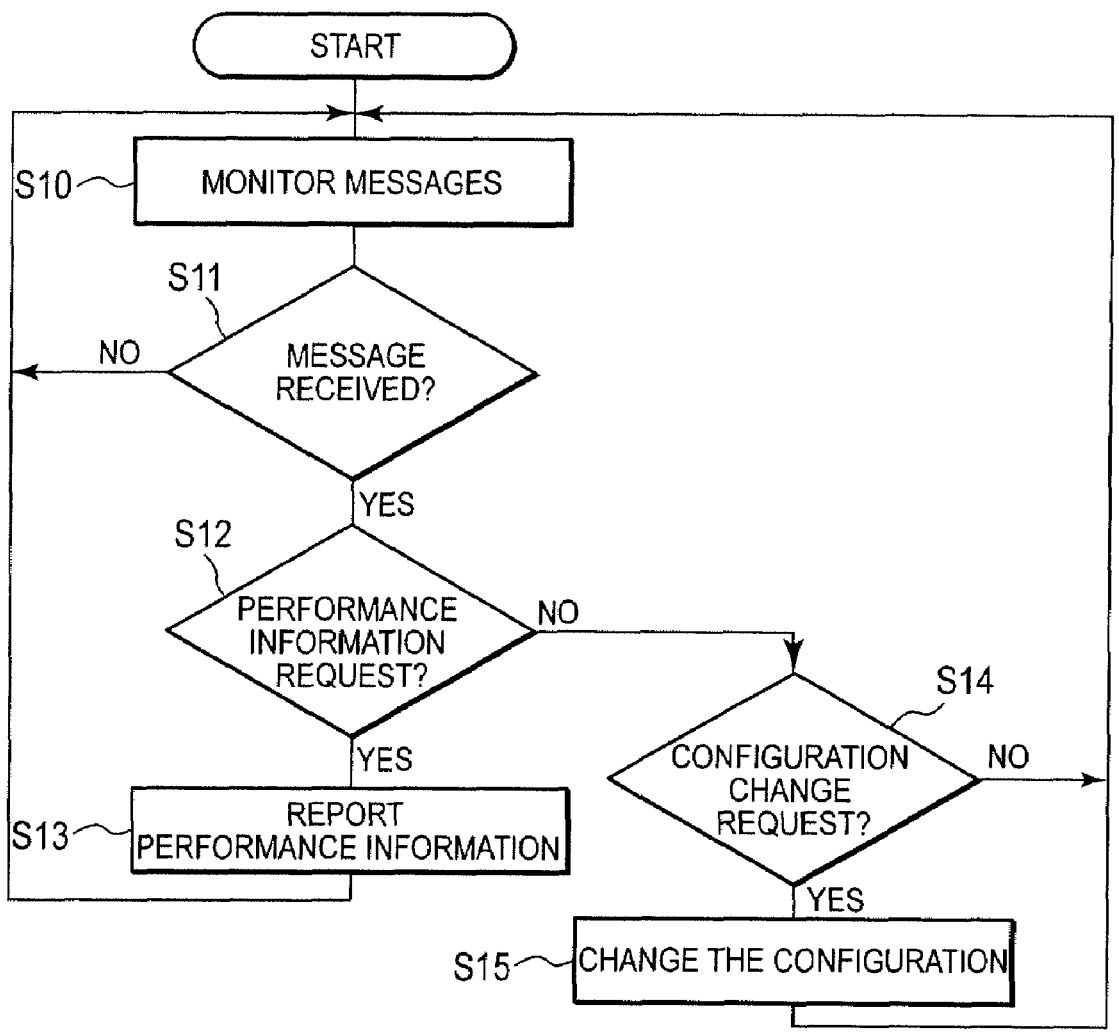
FIG. 6 is a flowchart of performance information report processing and configuration change processing by the optimization client program of the present invention.
Figure 7:
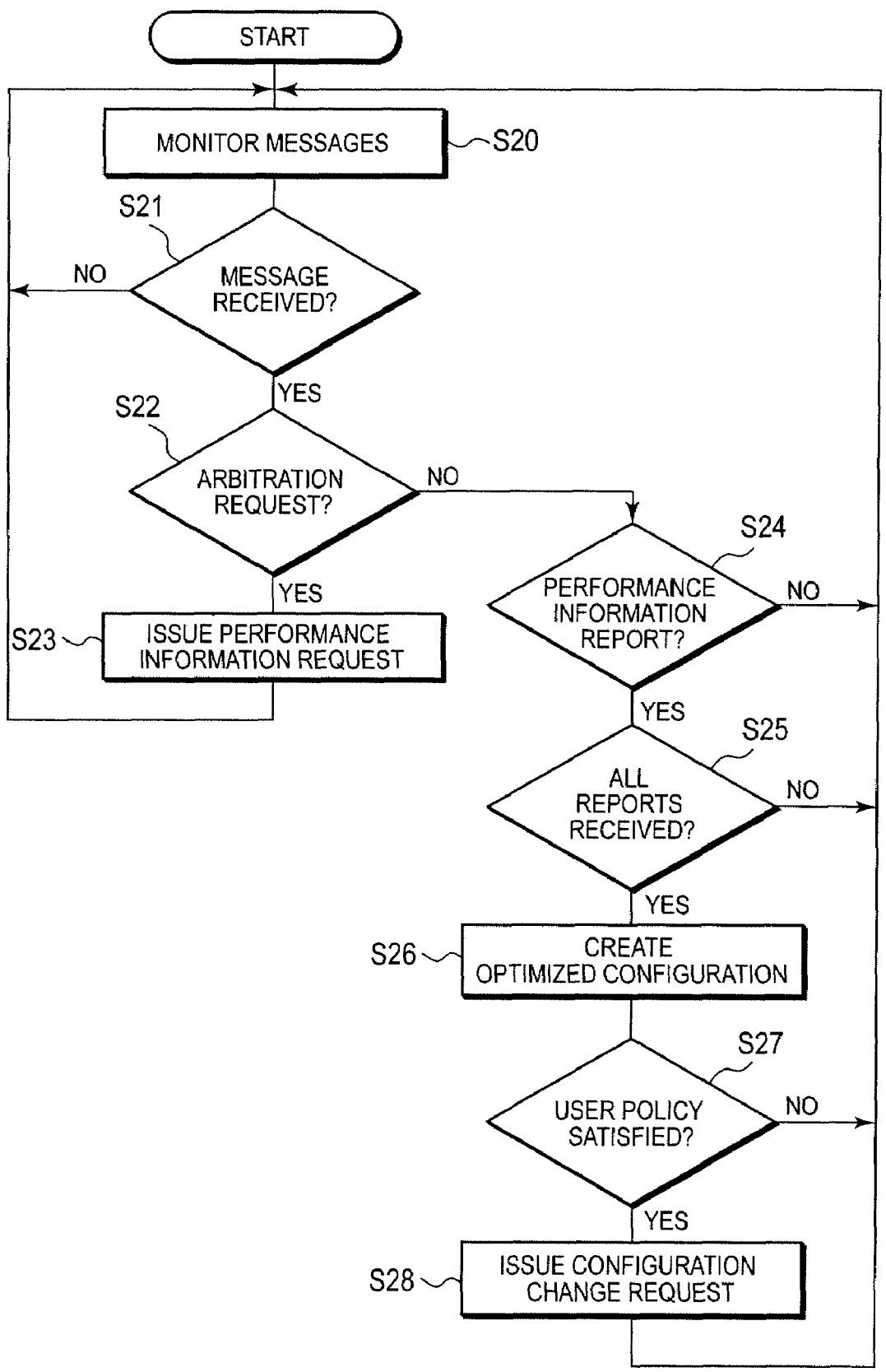
FIG. 7 is a flowchart of configuration change request processing by an arbitration server program of the present invention.

Next, a description will be made of configuration change processing in the exemplary embodiment of the blade server of the present invention with reference to FIGS. 4 through 7. FIG. 4 shows a sequence chart for the configuration change processing by the blade server of the present invention. FIG. 5 shows a flowchart of the arbitration processing of the optimization client program 101. FIG. 6 shows a flowchart of the performance information reporting processing and the configuration change processing by the optimization client program 101. FIG. 7 shows the configuration change processing by the arbitration server program 104.

Next, a description will be made of the configuration change processing of the blade server in an embodiment of the present invention with reference to FIG. 4. In this exemplary embodiment, a node $1_1$ is picked up from among plural nodes $1_1$ to $1n$ as an example for describing the above processing shown in FIG. 4 after a high load state is detected. The node $1_1$ monitors the load of the path leading to its connected PCI slot 4 referring to the latest performance information items 106 and 107. When the high load state is detected in the path, the node $1_1$ issues an arbitration request 111 to the arbitration node 1' (steps S102 and S104). In response to the request 111, the arbitration node 1' issues a performance information request 112 to each of the nodes $1_1$ to $1n$ (step S106). In response to the request 112, the nodes $1_1$ to $1n$ then transfer the latest performance information items 106 and 107 or performance statistical information 103 to the arbitration node 1' (step S108). Here it is assumed that the performance statistical information 103 is transferred from each of the nodes 1.

The arbitration node 1' then determines an optimized configuration on the basis of the performance statistical information 103 transferred from each of the nodes $1_1$ to $1n$ (step S110). Then, the arbitration node 1' refers to the performance statistical information 103 transferred from the node $1_1$ and the user policy 105 to determine whether to change the current configuration. For example, if the high load state of the monitored path is continued over an allowable time set in the user policy 105, the arbitration node 1' determines to change the current configuration. The arbitration node 1' then issues a configuration change request 113 and transfers the optimized configuration information 109 to each of the nodes $1_1$ to $1n$ (step S114). Receiving the request 113, each of the nodes $1_1$ to $1n$ controls the switch unit 3 and changes the connected PCI slot 4 (step S116). Furthermore, each of the nodes $1_1$ to $1n$ processes a specified task according to the received optimized configuration information 109.

As described above, the blade server of the present invention changes the current connection according to the load state in the path of the connection among the arbitration node 1' and nodes 1, and each PCI slots 4. Consequently, it is possible to distribute load avoiding a node 1 that uses a high load state path leading to its connected PCI slot. The arbitration node 1' can make load distribution according to the usage rate of the CPU and an I/O device of the node 1. Furthermore, the arbitration node 1' can change a path between each node 1 and an I/O slot 4 dynamically, thereby it is possible to improve the load distribution flexibility and use each I/O adapter for connecting an I/O slot 4 efficiently. According to the present invention, it is also possible to use a node, for example, a node 1n as both an ordinary node 1 and an arbitration node 1'. In this case, the node comes to have functions of both the node in and the arbitration node 1'.

Next, a description will be made of the arbitration request processing of a node 1 in steps S102 and S104 in FIG. 4 referring to FIG. 5. The node 1 monitors the load state of the internal bus 16, as well as each of the bus lines $2x1$ to $2xp$ (x=0 to n) of each PCI bus 2 and extracts the load state periodically as performance information items 106 and 107. The node 1 then stores extracted performance information items 106 and 107 in the memory 13 as performance statistical information 103 to manage the history of the load state.

The processor group 11 of the node 1 executes the optimization client program 101 to execute the load state monitoring processing and the arbitration request processing in steps S1 to S3 shown in FIG. 5. First, the processor group 11 monitors the load states of the internal bus 16 and each PCI bus 2 with reference to the performance statistical information 103 (step S1) and determines whether or not the internal bus 16 or PCI 2 is in the high load state based on the latest performance information items 106 and 107 set in the performance statistical information 103 (step S2). The optimization client program includes a threshold value set for determining a high load state. For example, a bus usage rate 50% is set as the threshold value. Preferably the user can set the threshold value. Different threshold values may also be set for the nodes $1_1$ to $1n$. And different threshold values may also be set for the internal bus 16 and the PCI bus lines $2x1$ to $2xp$ (x=0 to n).

The processor group 11 continues monitoring of the performance statistical information 103 periodically until a high load state is detected in step S2 (step S2 NO). If a high load state is detected in step S2 (step S2 YES), the processor group 11 issues an arbitration request 111 to the arbitration node 1' through the BMC 12 and the switch management network 5 (step S3). Because the transfer data length and the clock are different between the internal bus 16 and each PCI bus 2, a problem might be detected in the load state between the northbridge 14 and the PCI bridge 15 referring to performance information 106 even when there is no problem in the load state between the PCI bridge 15 and the object PCI slot 4 described in performance information 107 or vice versa. Thus the arbitration request 111 should preferably be issued even when only one of the internal bus 16 and the PCI bus 2 (more precisely one of the PCI bus lines $2xx$) is determined to be in a high load state. After an arbitration request 111 is issued (step S3), control returns to step S1 and the processor group 11 continues monitoring of the load state in both the internal bus 16 and each PCI bus 2 periodically. As described above, according to the present invention, therefore, it is possible to cope with load state changes quickly and flexibly, since each node 1 monitors its I/O load state and determines whether or not it is in a high load state.

Next, a description will be made of the message monitoring processing, performance information reporting processing, and configuration change processing in the node 1 with reference to FIG. 6. The processor group 11 that executes the optimization client program 101 executes the message monitoring processing, performance information reporting processing, and configuration change processing in steps S10 to S15 shown in FIG. 6.

The processor group 11 monitors messages issued from the arbitration node 1' (steps S10 and S11). Receiving a message from the arbitration node 1' and determining that the message is a performance information request 112 (step S12 YES), the processor group 11 reads the current performance information items 106 and 107 from the performance statistical information 103, then sends the information items 106 and 107 to the arbitration node 1' through the BMC 12 and the switch management network (step S13). If the message received from the arbitration node 1' is a configuration change request 113 (step S12 NO), the processor group 11 changes the current configuration according to the request 113 (step S15). After sending the performance information items 106 and 107 and ending the configuration change, the processor group returns to the monitoring of the messages from the arbitration node 1'.

The configuration change request 113 describes a hardware configuration (new connection between PCI bus lines $2x1$ to $2xp$ (x=0 to n) and PCI slot $4x$ (x=1 to m)) to be set by a node 1. The processor group 11 of the node 1 controls the switch unit 3 through the BMC 12 and the switch management network 5 according to the configuration change request 113 and disconnects the current PCI slot 4 from its own PCI bridge 15 and connects the PCI slot 4 designated in the configuration change request 113. At this time, the processor group 11 refers to the configuration information 114 received from the BMC 12 to recognize the previous configuration of the switch unit 3. The processor group 11 can also recognize the PCI slot 4 connected to another node 1 to obtain the configuration information 114 from the switch unit 3 through the BMC 12 and the switch management network 5. To obtain device information of another node 1, the conventional technology needs inquire of another node 1 about the device information. Therefore, if the communication line to another node 1 is disconnected by an error, for example, it is difficult to recognize the device (PCI slot 4) assigned to the node through an OS. On the other hand, according to the present invention, because configuration information is obtained from the switch unit 3 through the BMC 12 and the switch management network 5, it is easy to disconnect/connect the node 1 from/to the PCI slot 4 regardless of the state of the other communication paths with each of other nodes.

As described above, the cluster system of the present invention includes a switch management network 5 used for transmitting a load state and controlling the switch unit 3 separately from each data transmission path provided between nodes 1. Consequently, the switch unit 3 can be controlled without affecting the data transmission between those nodes 1 and without being affected by errors and the high load state in any of node I/O slots. Furthermore, the cluster system also includes an arbitration node 1' for managing all the connection between each of the plurality of nodes 1 and a PCI slot 4, so that the switch unit 3 can be controlled with coordination.

Next, a description will be made of message monitoring processing, arbitration processing, optimized configuration generating processing, and configuration change request processing executed in the arbitration node 1' with reference to FIG. 7. The processor group 11' of the arbitration node 1' executes the arbitration server program 104 to execute those processing of message monitoring, arbitration, optimized configuration generating, and configuration change request in steps S20 to S28 shown in FIG. 7.

The processor group 11' monitors messages issued from the nodes $1_1$ to $1n$ (steps S20 and S21). Receiving a message of an arbitration request 111 from a node 1 (step S22 YES), the processor group 11' issues a performance information request 112 to each of the nodes $1_1$ to $1n$ (step S23). Receiving the performance information report message (step S22 NO and step S24 YES), the processor group 11' repeats the processing in steps S20 to S24 until every performance information report is accepted. At this time, the node 1 sends its own recorded performance statistical information 103 to the arbitration node 1'. After obtaining the information 103 from each of the nodes $1_1$ to $1n$, the processor group 11' determines the optimized configuration and generates optimized configuration information 109 (step S25 YES and step S26). Such way, the arbitration node 1' collects performance information from the nodes $1_1$ to $1n$ when a high load state is detected in a path leading to the I/O slot 4, and then changes connection between nodes 1 and PCI slots 4 and adjusts a load to nodes $1_1$ to $1n$. As a result, the load comes to be distributed in the cluster system.

The optimized configuration information 109 is now described in detail. The optimized configuration information 109 is information for specifying a task to be processed by each node 1. For example, the information 109 includes information denoting the correspondence between a node 1 and a task to be processed by the node 1. The processor group 11' refers to the latest performance information items 106 and 107 in the performance statistical information 108 to identify the high load path and the low load path among paths (the internal bus 16 or any of the PCI bus lines $2x1$ to $2xp$ of the PCI bus) leading to each node 1. The processor group 11' also checks the processor load state exemplary referring to resource usage rates of the CPUs (processor group 11 here) to identify nodes 1 in high load state (or low load state). Then, the processor group 11' generates the optimized configuration information 109 to be used for moving a high load processing (task) to a node 1 connected to a low load path and/or a node 1 in which the processor group 11 is in the low load state.

A high or low load path can be determined based on performance information 106 or 107. A high or low load path can be a path whose performance information 107 shows high or low loads or any path of a node whose performance information 106 shows high or low loads. Or a high or load path also can be determined based on weighted average of performance information 106 and 107. The load may be judged by the value of the performance information 106, 107 or their proportions relative to the corresponding thresholds.

An example for setting the optimized configuration information 109 is shown below. For example when a node is processing many tasks, the I/O load of the node often stays high and accordingly the load of the internal bus 16 also stays high. Such a case can be detected by monitoring the performance information 106 and comparing it with the threshold. Also a node can detects high load of a PCI bus line $2nm$ by monitoring the performance information 107 and comparing it with a corresponding threshold. And a node that detects such cases (referred to as node A) issues an arbitration request 111 to the arbitration node 1'. The arbitration node 1' then refers to the performance information 106 and 107 included in the performance statistical information 103 obtained from the node 1 to select a data transfer path with lowest load in the cluster system. Then the arbitration node 1' issues a configuration change request 113 so as to disconnect the current PCI slot 4, which is connected to the node A via the high load internal bus 106 or PCI bus line $2mn$, from the node A and, to connect the PCI slot 4 to the selected bus with lowest load. More precisely for example, the I/O slot (e.g., I/O slot $4p$) is disconnected from the node 11 when the node 11 determines the PCI bus line (e.g., the PCI bus line $2_1p$) which connects I/O slot $4p$ to it has a high load based on the performance information 107 that includes information of each PCI bus line $2_{11}$ to $2_1p$. Then the I/O slot $4p$ is connected to a lower load path (e.g., the PCI bus line $2nx$ of the node $1n$). At this time, if there is a PCI slot connected to the low load path (the PCI bus line $2nx$ of the node $1n$), this I/O slot may be connected to a high load path (e.g., the PCI bus line $2_1p$ of the node $1_{11}$). Such way, an I/O slot connected to a high I/O load PCI bus line is connected to a node having a low load path; thereby the I/O load of the high load node can be lowered.

After that, to equalize the load among paths connected to the arbitration node 1' and each node 1, a task that will be given to each node 1 is determined and optimized configuration information 109 is generated. At this time, the task with maximum loading among the tasks processed by the node $1_1$ is moved to another node 1 connected to the path with low loading. The arbitration node 1' can recognize a load level of each task to a path according to the I/O processing volume measured by the OS.

The processor group 11' generates the optimized configuration information 109 by taking the CPU resources into consideration. The processor group 11' assigns takes based on the highest loading among CPU and paths. For example, if the node $1_1$ has a PCI bus 2 with usage rates of 65% and the node $1_2$ has a CPU with usage rate of 60%, the task with maximum loading among the tasks given to the node $1_1$ is moved to another node, for example, to the node $1n$. In addition to the load distribution based on the path load, the arbitration node 1' preferably should also be able to perform a load distribution based only on the CPU load like the conventional technique. As a result, the arbitration node 1' can execute load distribution according to the load state of each of the CPU resources if the high load state in a path doesn't exist.

The processor group 11' determines whether to change the current configuration according to the user policy 105 and the performance statistical information 103 received from each node 1 (step S27). At this time, the processor group 11' checks how long the high load state denoted by the current performance information items 106 and 107 included in the performance statistical information 103 is continued. If the high load state is continued over an allowable time set in the user policy 105 (step S27 YES), the processor group 11' issues a configuration change request 113 and sends the optimized configuration information 109 to each of the nodes $1_1$ to $1n$ (step S28). If the checked high load state is not continued over the allowable time included in the user policy 105 (step S27 NO), the processor group 11' goes to step S20 for monitoring messages without changing the current configuration.

In response to the configuration change request 113 received from the arbitration node 1', each of the nodes $1_1$ to $1n$ controls the switch unit 3 through the BMC 12 and the switch management network 5 to change its connected PCI slot 4. Each node then executes a task (load) specified in the optimized configuration information 109.

As described above, the blade server of the present invention uses the usage rate of the data transfer bus between each node and an I/O slot as the basic information for determining its optimized configuration. Consequently, it is possible to avoid a problem that the server performance cannot be fulfilled enough due to the congestion of the path leading to the IO when a load is applied to low load CPU. The blade server of the present invention can change a connection state freely between each node 1 and a PCI slot 4 with use of the switch unit 3. Consequently, there is no need to prepare the same number of adapters as the number of nodes 1; thereby the efficiency for using those adapters can be improved. Furthermore, the blade server of the present invention can change a connection state between each node 1 and a PCI slot 4 according to a load to be varied from time to time, thereby coping with load changes dynamically. As a result, the I/O slots can be used more efficiently.

While the exemplary preferred embodiment of the present invention has been described in detail, it is to be understood that the invention is not limited to these embodiments and modifications will be apparent to those skilled in the art without departing from the spirit of the invention. And although a blade server has been picked up as an example for describing the exemplary embodiment of the present invention, the present invention can also apply to a cluster system connecting a plurality of any computers.

What is claimed is:

1. A cluster system comprising:
   a first node including a plurality of paths respectively connected to I/O slots via a switch and;
   a second node including a plurality of paths connected to said switch, wherein
   said first node includes a first load measuring part which measures a first load for each path thereof, and
   said switch makes switching to disconnect an I/O slot from said first node and connect said I/O slot to said second node when said first load of the path connected to said I/O slot is higher than a first threshold.

2. The cluster system according to claim 1, wherein
   said first node further includes a second load measuring part which measures a second load which is a total load of all of said paths thereof, and
   said witching is made when said second load is higher than a second threshold.

3. The cluster system according to claim 2, wherein said second node includes a first load measuring part which measures a first load for each path thereof and one of said plurality of paths is determined to have a lowest load in said cluster system based on said first load.

4. The cluster system according to claim 3, further comprising:
   an arbitration node, wherein
   each of said first node and said second node sends said first load measured value to said arbitration node,
   said arbitration node issues a configuration change request based on said first load measured values received, and
   each of said first node and said second node controls said switch to make said switching.

5. The cluster system according to claim 4, further comprising:
   a switch management network for connecting said arbitration node, said first node, said second node and said switch, wherein
   each of said first node and said second node sends said first load measured value to said arbitration node and controls said switch through said switch management network.

6. The cluster system according to claim 5, wherein
   said arbitration node generates configuration information which specifies a task to be processed by each of said first node and said second node based on said first load measured values received and sends said configuration information to each of said first node and second node.

7. The cluster system according to claim 6, wherein
   each of said first node and said second node further includes performance statistical information that records said first load measured value in a time series and a user policy determining a condition to change a connection between an I/O slot and, said first node or said second node,
   each of said first node and said second node sends said performance statistical information to said arbitration node, and
   said arbitration node issues said configuration change request generated based on said performance statistical information and said user policy.

8. The cluster system according to claim 7, wherein
   said first node further includes a processor, a PCI bridge and a northbridge connected between said processor and said PCI bridge;
   said plurality of paths are a plurality of PCI buses connected to said PCI bridge,
   said PCI bridge includes said first load measuring part and said northbridge includes a second load measuring part, and
   said processor issues said arbitration request to said arbitration node.

* * * * *